(12) United States Patent
Raybone et al.

(10) Patent No.: US 6,994,830 B1
(45) Date of Patent: Feb. 7, 2006

(54) REACTOR FOR PLASMA TREATMENT OF GASES

(75) Inventors: David Raybone, Stow-on-the-Wold (GB); James Timothy Shawcross, Charlbury (GB); Anthony Robert Martin, Abingdon (GB); Suzanne Elizabeth Thomas, Kenilworth (GB)

(73) Assignee: Accentus plc, Didcot (GB)

( * ) Notice: Subject to any disclaimer, the term of this patent is extended or adjusted under 35 U.S.C. 154(b) by 68 days.

(21) Appl. No.: 10/089,238

(22) PCT Filed: Oct. 16, 2000

(86) PCT No.: PCT/GB00/03943

§ 371 (c)(1),
(2), (4) Date: Mar. 28, 2002

(87) PCT Pub. No.: WO01/30485

PCT Pub. Date: May 3, 2001

(30) Foreign Application Priority Data

Oct. 22, 1999 (GB) .................................... 9924999

(51) Int. Cl.
*B01J 19/08* (2006.01)
*C01B 21/00* (2006.01)

(52) U.S. Cl. ................. 422/186.04; 422/186; 204/164; 204/173; 204/174; 204/177

(58) Field of Classification Search ................ 422/186, 422/186.04; 204/164, 173, 174, 177
See application file for complete search history.

(56) References Cited

U.S. PATENT DOCUMENTS 6,176,078 B1 * 1/2001 Balko et al. .................. 60/274
6,475,350 B2 * 11/2002 Palekar et al. .............. 204/164

* cited by examiner

*Primary Examiner*—Steven Versteeg
(74) *Attorney, Agent, or Firm*—William H. Holt

(57) ABSTRACT

In a non-thermal plasma reactor (300), at least a component of the active material (320) is selected or modified to provide the capability to adsorb or trap a predetermined chemical species in the gas flow thereby to increase the effective residence time of said species relative to the residence time of unadsorbed species in the gas flow.

17 Claims, 1 Drawing Sheet

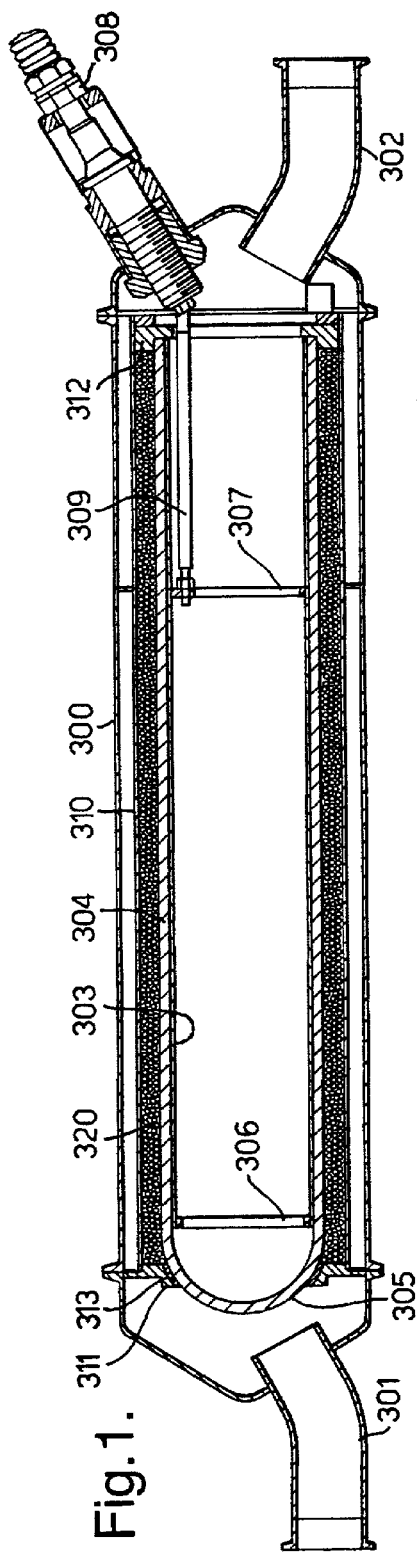
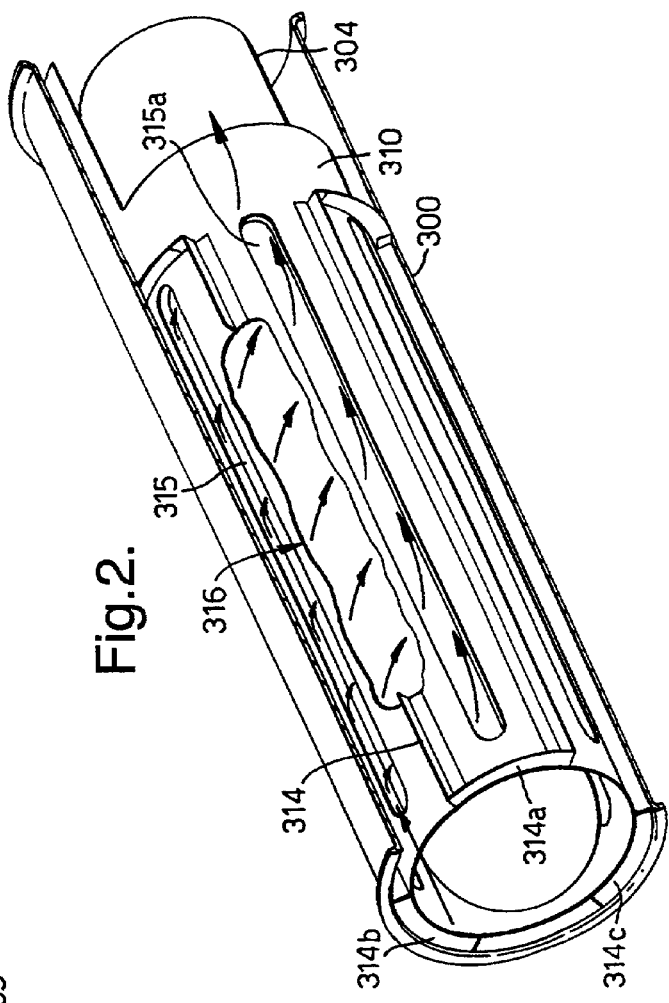
Fig.1.
Fig.2.

REACTOR FOR PLASMA TREATMENT OF GASES

The invention relates to a reactor for plasma treatment of gases and more particularly to a method of manufacturing a reactor utilising a non-thermal plasma.

There is increasing interest in the use of non-thermal plasmas for treatment of gaseous exhausts and in particular for treatment of exhausts from motor vehicles. Treatment of exhausts involves conversion of harmful exhaust components such as hydrocarbons to carbon dioxide and water as well as harmful $NO_x$ components of exhausts to nitrogen. In the case of lean burn engines such as diesels there is a requirement for removal of carbonaceous particulates by for example oxidation to carbon dioxide. Examples of non-thermal treatment of exhausts are described in U.S. Pat. No. 3,983,021 (Monsanto), U.S. Pat. No. 5,147,516 (Tecogen) and U.S. Pat. No. 5,254,231 (Battelle Memorial Institute). GB 2,274,412 (AEA Technology) describes a method for the treatment of diesel emissions by a non-thermal plasma for oxidation of carbonaceous particulates and reduction of $NO_x$ to nitrogen.

Plasma can be used to activate or produce reactant species, which can then subsequently react with or without catalytic enhancement to yield the desirable products. For example, our publication WO99/12638 describes the plasma production of plasma activated hydrocarbons as a precursor to the selective catalytic reduction of $NO_x$ to $N_2$. Examples of catalysts for this selective reduction of $NO_x$ to nitrogen are alkali metal-exchanged zeolite Y or silver aluminate. Other metal-exchanged or metal doped zeolite material such as those known as Cu/ZSM-5, Fe/ZSM-5, Co/ZSM-5, zeolite beta and hydrogen exchanged zeolites such as H-ZSM-5 are suitable materials. Other suitable catalysts are aluminas including alpha, gamma, chi and other crystalline phases, oxides of titanium, zirconium, cerium and vanadium, perovskites, spinels and mixtures of these materials. Metal doped inorganic oxides such as cobalt-doped aluminas are also suitable materials. Examples of suitable catalysts are also described in an article 'Selective catalytic reduction of NOx with N-free reductants' by M Shelef published in Chem Rev 1995, pp 209–225.

In such catalytically enhanced plasma processes the reactant species such as plasma activated hydrocarbons, which can include oxygenated hydrocarbons, are often produced as intermediates in e.g. the stepwise decomposition of hydrocarbons by reactions of $O_2$, O, OH and $HO_2$. Where the reactants are intermediates and the catalyst is highly selective to a given reductant, optimisation of the process can become difficult, if not impossible. This is because the completeness of the plasma reactions and hence the concentration of intermediates is controlled largely by the input power (joules per second) for a given residence time in the plasma reactor. This leads to the idea of a normalised unit expressed in joules per liter, which will determine the concentration of intermediates in a plasma reactor. For example in an article 'Plasma assisted catalytic reduction of $NO_x$ by BM Penetrante et al, SAE 982508, it is shown how the gas phase composition changes with input power expressed as joules per liter of gas volume for an exhaust flow in liters per unit time. This key parameter, joules/liter, is largely fixed by vehicle constraints, i.e. reactor size, and the acceptable level of power input to the reactor in as far as all of the exhaust passes through the reactor.

The present invention is based upon an appreciation of the advantages that follow if one changes the residence time of selected species in the reactor, and thus breaks the, at present unavoidable, link between joules per liter input power and reactant species. This would lead to a simplification in the design and an improvement in the energy efficiency of plasma reactors.

Examples have been given which show that, without catalytic enhancement, plasma reactors can produce quantities of undesirable by-products usually associated with partial oxidation of hydrocarbons (see 'Analysis of plasma-catalysis for diesel $NO_x$ remediation' by J Hoard and M L Balmer, SAE 982429), for example methyl nitrate, formaldehyde. A solution is offered if hydrocarbons can be retained for relatively long periods of time to achieve complete conversion to CO and $CO_2$, while oxides of nitrogen may require a short residence time to avoid formation of acids.

It is an object of the present invention to provide a method of manufacturing a component for a non-thermal plasma reactor which addresses these problems.

The invention provides, in one of its aspects, a method of treating gases which contain nitrogen oxides, carbonaceous particulates including, hydrocarbons, and other residual constituents, which method comprises passing the gases through a reactor comprising at least one bed of active material in an enclosure having gas flow conduits for directing gas flow through or over the bed of active material, applying an electrical potential to generate a non-thermal plasma in gas permeating the active material, at least a component of the active material being such as to adsorb or trap carbonaceous particulates the electrical potential being applied to generate said non-thermal plasma during passage through the active material of the gases undergoing treatment and the component of active meterial is so as to selectively adsorb or trap carbonaceous particulates and the gases are further subjected to the action of a NO selective catalyst comprising silver doped alumina which selectively absorbs both NO and hydrocarbons and/or partially oxygenated hydrocarbons and promotes their reaction together to reduce NO directly to $N_2$.

Preferably the said active material or component thereof is selected for its capability to adsorb or trap a predetermined chemical species in the exhaust gas flow produced as a result of the combustion of fuel, and any modifier or additive therein, by the internal combustion engine.

Or further, the said active material or component thereof may be selected for its capability to adsorb or trap a predetermined chemical species in the gas flow produced by non-thermal plasma activation of constituents thereof.

In accordance with the invention in these circumstances the predetermined chemical species may be, but is not restricted to a species from the group comprising nitrogen, oxygen, oxides of nitrogen such as NO, $NO_2$, oxides of carbon such as CO, $CO_2$, water, hydrocarbons including saturated, unsaturated, cyclic, branched and un-branched hydrocarbons, oxygenated hydrocarbons such as aldehydes, ketones, alcohols, acids ethers and esters, aromatic hydrocarbons and derivatives thereof including poly aromatic hydrocarbon compounds, oil fractions, fuel and partially burned fuel, air and air/fuel mixes, smoke, carbonaceous particulate including the soluble organic fraction and carbon, fine and ultrafine fraction, sulphur compounds including $SO_2$ and sulphates, organo-nitrogen species, acid gases, combustion modifiers/enhancers, additives such as urea, ammonia, cerium oxide (such as Eolys) and plasma activated species such as O, OH, $O_3$ activated hydrocarbons including partially oxygenated hydrocarbons/organic molecules and electronically and vibrationally excited state species.

The invention includes a non-thermal plasma reactor for the treatment of gases, which contain nitrogen oxides, carbonaceous particulates, hydrocarbons, and other residual constituents, which reactor comprises a bed of active material in an enclosure having gas flow conduits for directing gas flow through or over the bed of active material, electrodes adapted when electrically energized to generate non-thermal plasma in the gas permeating the active material, at least a component of the active material acting to adsorb or trap carbonaceous particulates in the gas flow, wherein, in operation of the reactor, the component of active material is such as selectively to adsorb or trap carbonaceous particulates and an NO selective catalyst comprising silver doped alumina is additionally provided for selectively adsorbing both NO and hydrocarbons and/or partially oxygenated hydrocarbons, and promoting their reaction together to reduce NO direclty to $N_2$.

The function of the active material, or component thereof, having the capability to adsorb or trap selected species can be seen as that of a selective filter for that species.

In addition to the advantages, referred to above, which result from the effective increase in residence time of the selected species, such a selective filter can operate to adsorb or trap the reactants and hold them for sufficient time for them to be activated by a plasma and/or selected filter to a state where they can react with for example $NO_x$ to yield desirable products. In this role the filter material or trapped species in the presence of a plasma can be made to appear to act as a catalytic surface but importantly neither the plasma nor the selective filter nor the trapped species alone need have catalytic properties. One example of a trapped species is carbonaceous particulate material from a diesel engine, for example soot that consists mainly of elemental carbon. In the plasma region soot becomes exposed to plasma generated species for example oxygen atoms. Oxygen atoms or other plasma generated species may diffuse into, adsorb and react with soot. Other plasma generated species include but are not restricted to OH, $O_3$ and $NO_2$. For example it is known oxygen atoms can diffuse into soot and form aldehyde-type groups on the surface. Oxygenated soot has different activated and catalytic properties to non-oxygenated soot. In this example the surface of the reactant material, e.g. carbon is transformed into a catalyst.

A selective filter according to the present invention provides, by selective modification of residence times, a method of controlling and hence optimising the distribution of product species from a plasma reactor with a significant degree of independence from flow rate, reactor size or energy density. The method of controlling and hence optimising the distribution of product species may include a method for optimising the desorption of the selectively filtered species or by-product from these species following material or plasma activation, for example by variation of the temperature or the filter material.

Following the selective filtration of carbonaceous particulate in the plasma region the operation of the selective filter according to the present invention also allows for the desorption and/or decomposition by reactive or thermal methods of the carbon functionalities formed on the surface or in the bulk, such as for example aldehyde-type groups formed on the surface. However, an important aspect of this functioning of the selective filter is that it provides for the carbonaceous soot to be oxidised at low temperatures to $CO_2$ and CO. Ordinarily, carbonaceous soot combusts at high temperature in excess of 500° C. whereas, utilising this function of the selective filter, the soot can be oxidised effectively at temperatures as low as 100° C. This is a major advance over prior art soot oxidation catalysts where temperatures are typically lowered to 250 –300° C.

A specific embodiment of the invention will now be described by way of example with reference to the accompanying drawings, which illustrate one suitable form for the structure of a reactor and its bed of active material. In the drawings:

FIG. 1 is a longitudinal section of the reactor, and

FIG. 2 is a schematic view showing the gas flow path through the reactor of FIG. 1, Referring to FIG. 1, a reactor for the plasma assisted processing of the exhaust emissions from internal combustion engines to remove noxious components therefrom consists of a reactor chamber 300 which has inlet and outlet stubs 301, 302, respectively, by means of which it can be incorporated into the exhaust system of an internal combustion engine.

Inside the reactor chamber 300 there is an inner electrode 303 which is supported within a dielectric tube 304, made for example out of .-alumina which has its upstream end closed by a spherical dome 305 to facilitate the flow of exhaust gases through the reactor. The inner electrode 303 is supported in the dielectric tube 304 by two spider supports 306, 307. The inner surface of the dielectric tube can be metallised with a metal coating in order to increase the physical contact between the electrode and dielectric tube. The support 307 is connected to a high voltage input terminal 308 via a ceramic insulated feed 309 so that a potential of the order of kilovolts to tens of kilovolts and repetition frequencies in the range 50 to 5000 Hz can be applied to the inner electrode 303. Concentric with the inner electrode 303 and dielectric tube 304 is a grounded outer electrode 310 made for example of stainless steel. The dielectric tube 304 and outer electrode 310 are supported within the reactor chamber 300 by disks 311, 312 made of an insulating ceramic material, such as alumina. A compliant heat resistant material 313 is interposed between the electrode support 311 and the dielectric tube 304.

The space between the dielectric tube 304 and the outer electrode 310 is filled with a bed of active material 320, shown in FIG. 1, but omitted from FIG. 2 for clarity of representation of the gas flow paths.

As shown in FIG. 2, the outer electrode 310 has a series of baffles 314 and slots 315 315a. The baffles 314 extend from the outer electrode 310 to the inner surface of the wall of the reactor chamber 300 and act as grounding connections as well as causing the exhaust gases to follow a convoluted path which has both axial, and circumferential components and being at least partially helical. There is also a radial component of flow, initially inwardly as the gas transfers from outside the outer electrode 310 to the space between the electrodes 310 and 303 and then outwardly as the gas returns to exit from outside the outer electrode 310. Thus there is also a spiral component in the flow.

The baffle 314 is arranged to divide the space between the electrode 310 and the reactor chamber 300 into six segments. At the gas inlet end three of these segments are closed off at 314a, 314b and 314c to axial gas flow and the remaining three segments are open to axial gas flow into the space between the electrode 310 and the reactor chamber 300. These latter three segments are closed off by the baffle 314 at the gas outlet end of the reactor. Consequently the gas is forced to pass via slot 315 radially into the space between the electrodes 303 and 310 then passing in at least a partially helical manner before passing radially via the next slot 315a into the next segment of space between electrode 310 and reactor chamber 300. The baffle 314 leaves open this segment at the gas outlet end, allowing exhaust of the treated gas. Thus it will be seen that the exhaust gases both enter and leave the main part of the reactor 300 along the surface of the outer electrode 310 and the electrode supports 311, 312 have reliefs at their circumferences which are so positioned as to permit this to happen. Thus for a given gas velocity, the residence time of the exhaust gases in the electric field is increased compared with either purely axial or radial flow. Note that in FIG. 2 part of the electrode 310 has been shown cut away at 316. This cut away is shown in the Figure only to illustrate the flow of the exhaust gases as they pass between the electrodes 303 and 310 and does not represent a structural feature of the reactor.

For a reactor suitable for the present invention there may be adopted any other structural form as described in our patent specification WO99/12638, or in other embodiments described in the specification of our patent application PCT/GB 00/01881. The active material 320 comprises polymeric, ceramic, or metallic material which can be in the form of spheres, pellets, extrudates, fibres, sheets, coils, granules, wafers, meshes, frits, foams, honeycomb monolith or membrane in the plasma region of the non-thermal plasma. Combinations of one or more of the above can be used to create a structure with a non-uniform surface area and porosity, for example a graded porosity, when presented to the gas. Foams and monoliths can be ceramic, metallic or polymeric and examples of foams and monoliths include but are not limited to alumina, zirconia, titania, zeolite for foams and cordierite, silicon carbide, alumina, zeolite and Fecralloy for a honeycomb monolith reactor. The active material can also be a carbon combustion catalyst for example cerium oxide, alkali metal oxide, or lanthanum oxide/alkali metal oxide/vanadium pentoxide, vanadates such as metavanadates and pyrovanadates. At least a component of the active material 320 is selected or modified in order to adsorb or trap a predetermined chemical species in the gas flow thereby to increase the effective residence time in the reactor of the said species relative to the residence time of unadsorbed or untrapped species in the gas flow. The active material 320 may comprise a plurality of components each of which adsorbs or traps a different chemical species thereby to increase the effective residence time in the reactor of each of the different adsorbed or trapped chemical species. It will be appreciated that a selected or modified component of the active material may adsorb or trap more than one selected chemical species. Also, where a plurality of components is provided each of which adsorbs or traps a different chemical species, the respective adsorptions may be different for each different adsorbed or trapped species, thus providing a correspondingly different increase in the effective residence time of each of the different adsorbed or trapped species.

Suitable non-thermal plasma reactors are those of the ferroelectric bed type comprising a bed of material contained between two electrodes, dielectric barrier or silent discharge type, pulsed corona discharge reactor or surface discharge reactor or combination of reactors.

When a gas molecule, for example, hydrocarbon enters a non-thermal plasma it resides in the plasma zone for a given period of time known as the residence time whereupon chemical reactions can occur. When a selective filter in accordance with the present invention is present in the plasma region the residence time of selected gas molecules in the plasma region increases. This is because a selected gas molecule on entering the plasma zone is adsorbed or trapped onto the surface of material in the bed, and can then be activated, react and desorb at a later time from the surface. The molecule now in the gas phase can readsorb onto different regions of the bed. This process of adsorption or trapping, activation or reaction, desorption and readsorption can occur throughout the plasma region thus increasing residence times of selected molecules entering the plasma region allowing chemical reactions to occur more extensively. Controlled adsorption and desorption may be used as an overall strategy to control the gas mixture exiting the reactor. In another example the selective filter may adsorb or trap species prior to plasma activation and/or surface decomposition and subsequent desorption. The material composition, e.g. acidity (Bronsted and Lewis acid sites), pore size, pore shape, pore size distribution, surface area are characteristics which can be modified to effect different residence times and selectivity.

The method of the invention is further illustrated by considering the specific example of removing carbonaceous particulate in the form of soot.

Attention has been focussed in most prior art arrangements on the removal of nitrogen oxides, without consideration of soot removal, typically by passing the gases containing the nitrogen oxides and soot for treatment through a non-thermal plasma reactor which contains no packing material (unpacked reactor), followed by a suitable selective reduction catalyst. The role of the plasma is to convert NO to $NO_2$ via a peroxy oxidation chain mechanism. The initial steps of this mechanism are believed to be dependant upon the reaction of O atoms, formed by the plasma, with hydrocarbons which through a chain mechanism (involving $O_2$ and OH reactions with the hydrocarbons and products of the O and hydrocarbon reactions) form peroxy species which are implicated in the NO to $NO_2$ oxidation reaction. The $NO_2$ in the presence of hydrocarbons in the exhaust gas is reduced to nitrogen by the catalyst by a hydrocarbon selective catalytic reduction mechanism.

Removal of soot by non-thermal plasma oxidation as it flows through an unpacked reactor would require a relatively high energy input (joules per liter) achieved by either applying a considerable increase in applied energy or a considerable decrease in the exhaust gas flow to an impractical level. Trapping the soot so as to increase its residence time in the plasma reduces this energy requirement. In the plasma region, the soot becomes exposed to oxidative radicals such as O, OH, $O_3$ which then oxygenate the soot. The oxygenated soot has different activated and catalytic properties to unoxygenated soot, which result in, for example, its oxidation at lower temperatures than would be observed using a purely thermal technique. The material for the selective filter for this purpose is primarily chosen for its ability to trap soot. Beads of alumina (CT530) provide a suitable material for this purpose, but may desirably be combined with a combustion catalyst material or a more soot-philic compound. Some improvement in the trapping effectiveness of the material may be provided by appropriate choice of the form in which the material is incorporated in a reactor, that is specifically whether it is incorporated in the form of sheets, wafers, meshes, frits, coils, spheres, pellets, extrudate, granules, fibres, foams or honeycomb monolith or as a coating on sheets, wafers, meshes, frits, coils, spheres, pellets, extrudates, granules, fibres or honeycomb monolith, foam, or membrane.

However, it is to be appreciated that using a packing material to trap soot in this way results in competition for the O-atoms and other oxidative species which would otherwise be involved in the NO to $NO_2$ peroxy oxidation chain mechanism. The rates of reaction of O and other oxidative species with soot are faster than the hydrocarbon oxidation reaction so that conversion of NO to $NO_2$ is much less likely to occur.

This is then an example of how using a selective filter approach can significantly change the chemistry of a system. In this example, a dominant homogeneous gas phase reaction mechanism, plasma enhanced NO to $NO_2$ conversion is changed by the choice of a selective soot filter to promote an alternative heterogeneous soot oxidation mechanism using the same basic species found in the exhaust stream.

This has important implications for combined soot and $NO_x$ removal as this suggests that by removing the soot in a packed reactor you reduce the possibility for $NO_x$ reduction to nitrogen by a hydrocarbon selective catalytic reduction of $NO_2$.

In accordance with the present invention, to achieve a combined soot and $NO_x$ removal this alteration in the chemistry taking place within the reactor as a consequence of trapping soot has to be taken into account. One approach is to use an NO selective catalyst such as a silver doped alumina catalyst, which functions by selectively adsorbing both the NO and also hydrocarbons and/or partially oxygenated hydrocarbons in the exhaust and promoting their reaction together to reduce NO directly to $N_2$. The function of this silver doped alumina catalyst in this way is dependent upon the type of hydrocarbons and its performance may be improved by activation of hydrocarbons in the exhaust gas stream by for example plasma activation, to form species such as partially oxygenated hydrocarbons, for example formaldehyde ($CH_2O$). The presence of the non-thermal plasma is important for this in that it is effective for the required activation of hydrocarbons at significantly lower temperatures than those required for thermal production of oxygenated hydrocarbons.

It will be apparent to those skilled in the art that this selective filter approach may be applied to other chemical processes, gases and exhaust streams.

The filter material may be selected for its ability to trap or adsorb a predetermined species in the destruction of toxic waste compounds for example those used in applications such as the micro-electronics and semi-conductor industries. Examples of these include species such as volatile organic compounds, halogen-containing compounds including perfluorocarbons, hydrofluorocarbons and Freons. Increasing the residence time of these species in the plasma by using a selective filter may result in an increase in the efficiency of their destruction.

In another example the selective filter material may be chosen for its ability to trap or adsorb a predetermined species produced in the plasma to coat or modify the filter material in some way.

The filter material may be selected for its ability to trap or adsorb a predetermined species produced in the plasma to prevent a certain gas phase chemical reaction occurring. This could be to prevent a pollutant or toxin being formed or to act as an inhibitor for a certain isomer or molecule in a chemical process. As an example the filter material may be selected for its ability to trap or adsorb a predetermined polymer chain length or type from the gas phase in a plasma polymerisation process. The material could be selected to trap the polymer products required or to take out unwanted by-products to allow the desired product to be collected downstream.

What is claimed is:

1. A method of treating gases which contain nitrogen oxides, carbonaceous particulates hydrocarbons, and other residual constituents, which method comprises passing the gases through a reactor comprising at least one bed of active material in an enclosure having gas flow conduits for directing gas flow through or over the bed of active material, applying an electrical potential to generate a non-thermal plasma in gas permeating the active material, at least a component of the active material being such as to adsorb or trap carbonaceous particulates, the electrical potential being applied to generate said non-thermal plasma during passage through the active material of the gases undergoing treatment and the component of active material is so as to selectively adsorb or trap carbonaceous particulates and the gases are further subjected to the action of a NO selective catalyst comprising silver doped alumina which selectively absorbs both NO and hydrocarbons and/or partially oxygenated hydrocarbons and promotes their reaction together to reduce NO directly to $N_2$.

2. A method as claimed in claim 1, wherein the gases subjected to the action of a NO selective catalyst are also subjected to further plasma activation which promotes the formation of activated hydrocarbons and/or partially oxygenated hydrocarbons.

3. A method as claimed in claim 1, wherein the bed of active material comprises beads of alumina.

4. A method as claimed in claim 1, wherein the bed of active material includes a combustion catalyst.

5. A method as claimed in claim 4, wherein the combustion catalyst comprises one or more materials selected from the group consisting of alkali metal oxide, or lanthanum oxide/alkali metal oxide/vanadium pentoxide, and vanadates.

6. A method as claimed in claim 4, wherein oxidation to carbon dioxide and carbon monoxide of the said carbonaceous particulates occurs at temperatures lower than the respective thermal oxidation temperature thereof.

7. A method as claimed in claim 6, wherein the said oxidation to carbon dioxide and carbon monoxide occurs at temperatures lower than 250° C.

8. A method as claimed in claim 6, wherein the said oxidation to carbon dioxide and carbon monoxide occurs at temperatures as low as 100° C.

9. A method as claimed in claim 1, wherein the gases are subjected to flow through or over a plurality of beds of active material each of which adsorbs or traps a different predetermined chemical species.

10. A method as claimed in claim 9, wherein, in the plurality of beds of active material, there is included, in addition to the active material for trapping carbonaceous particulates, active material which adsorbs or traps one or more predetermined chemical species from the group consisting of nitrogen, oxygen, oxides of carbon, water, hydrocarbons including saturated, unsaturated, cyclic, branched and un-branched hydrocarbons, oxygenated hydrocarbons, aldehydes, ketones, alcohols, acids ethers and esters, aromatic hydrocarbons and derivatives thereof, oil fractions, fuel and partially burned fuel, air and air/fuel mixes, sulphur compounds, organonitrogen species, acid gases, combustion modifiers/enhancers, urea, ammonia, cerium oxide and plasma activated species including O, OH, $O_3$ activated hydrocarbons including partially oxygenated hydrocarbons/ organic molecules and electronically and vibrationally excited state species.

11. A method as claimed in claim 10, wherein the said additional active material is appropriately selected from the group consisting of dielectric or ferroelectric material, polymeric material, and ceramic material.

12. A method as claimed in claim 1, wherein the bed or beds of active material is or are provided in the form of sheets, wafers, meshes, frits, coils, spheres, pellets, extrudate, granules, fibers, foams or honeycomb monolith or as a coating on sheets, wafers, meshes, frits, coils, spheres, pellets, extrudates, granules, fibers or honeycomb monolith, foam, or membrane.

13. A method as claimed in claim 1, wherein dielectric barrier material between the electrodes establishes a dielectric barrier discharge reactor.

14. A non-thermal plasma reactor for the treatment of gases, which contain nitrogen oxides, carbonaceous particulates, hydrocarbons, and other residual constituents, which reactor comprises a bed of active material in an enclosure having gas flow conduits for directing gas to flow through or over the bed of active material, electrodes adapted when electrically energized to generate non-thermal plasma in the gas permeating the active material, at least a component of the active material acting to adsorb or trap carbonaceous particulates in the gas flow, wherein, in operation of the reactor, the component of active material is so as to selectively adsorb or trap carbonaceous particulates and an NO selective catalyst comprising silver doped alumina is additionally provided for selectively adsorbing both NO and hydrocarbons and/or partially oxygenated hydrocarbons, and promoting their reaction together to reduce NO directly to $N_2$.

15. A non-thermal plasma reactor as claimed in claim 14, wherein the bed of active material comprises beads of alumina.

16. A non-thermal plasma reactor as claimed in claim 14, wherein the bed of active material includes a combustion catalyst.

17. A non-thermal plasma reactor as claimed in claim 16, wherein the combustion catalyst comprises one or more materials selected from the group consisting of alkali metal oxide, or lanthanum oxide/alkali metal oxide/vanadium pentoxide, and vanadates.

* * * * *